United States Patent [19]
Thayer

[11] Patent Number: 5,292,069
[45] Date of Patent: Mar. 8, 1994

[54] CONVERTIBLE PLUG NOZZLE

[75] Inventor: Edward B. Thayer, Palm Beach Gardens, Fla.

[73] Assignee: United Technologies Corporation, Hartford, Conn.

[21] Appl. No.: 87,827

[22] Filed: Jul. 7, 1993

[51] Int. Cl.5 .............................................. F02K 1/40
[52] U.S. Cl. ............................ 239/127.3; 239/265.29; 239/265.37
[58] Field of Search ............. 239/127.1, 127.3, 265.11, 239/265.13, 265.17, 265.19, 265.25–265.39; 60/271, 229, 261

[56] References Cited

U.S. PATENT DOCUMENTS

| | | | |
|---|---|---|---|
| 4,043,508 | 8/1977 | Speir et al. | 239/265.19 |
| 4,074,859 | 2/1978 | Lowman, Jr. | 239/265.33 |
| 4,605,169 | 8/1986 | Mayers | 239/265.29 |
| 4,641,782 | 2/1987 | Woodward | 239/265.29 |
| 4,805,401 | 2/1989 | Thayer et al. | 239/265.29 |
| 4,819,876 | 4/1989 | Thayer | 239/265.25 |
| 4,828,173 | 5/1989 | Guerty | 239/265.19 |
| 4,836,451 | 6/1989 | Herrick et al. | 239/265.27 |
| 4,884,748 | 12/1989 | Ward et al. | 239/265.19 |
| 4,993,641 | 2/1991 | Kehret et al. | 239/127.3 |
| 5,079,912 | 1/1992 | Cires et al. | 239/127.1 |
| 5,080,284 | 1/1992 | Cires et al. | 239/127.3 |
| 5,188,292 | 2/1993 | Frey et al. | 239/127.3 |

*Primary Examiner*—Andres Kashnikow
*Assistant Examiner*—Karen B. Merritt
*Attorney, Agent, or Firm*—Edward L. Kochey, Jr.

[57] ABSTRACT

A plug nozzle is convertible to and from an open nozzle by moving several components. The convergent flap moves between an outboard convergent flap position and a central plug position. Divergent flaps, hinged to the convergent flaps, move between the outboard divergent flap position and a central contacting position within the plug. Plug surface flaps are moved to the inboard position where they form the plug surface from an outboard position.

9 Claims, 2 Drawing Sheets

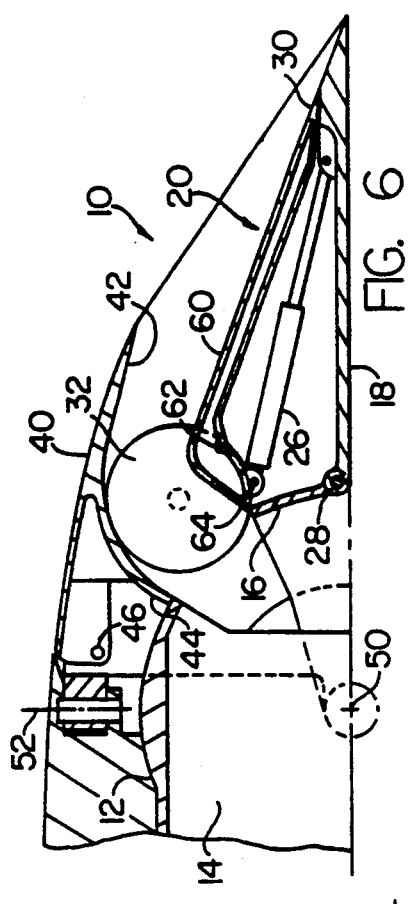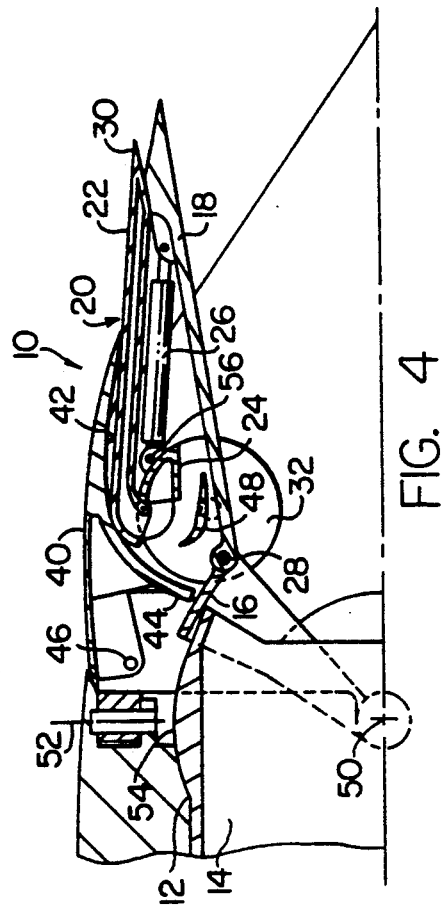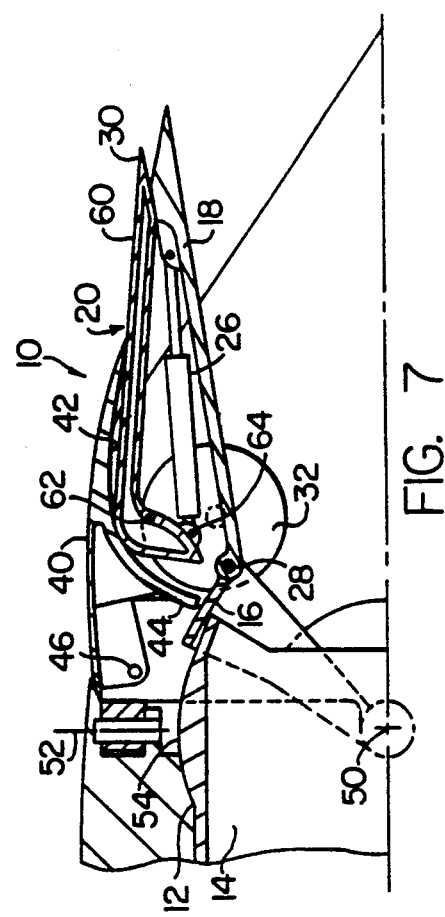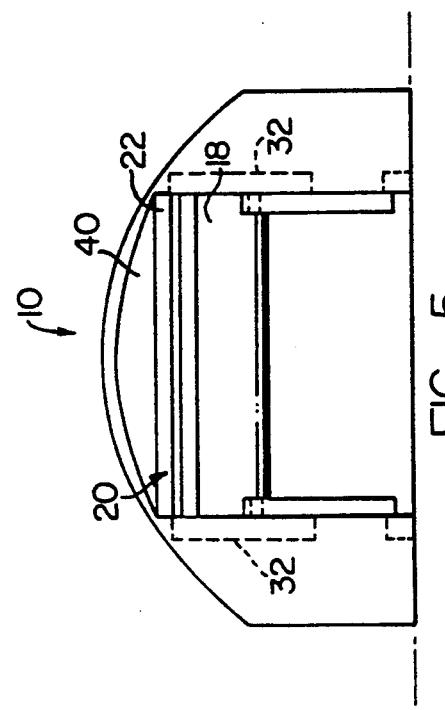

CONVERTIBLE PLUG NOZZLE

TECHNICAL FIELD

The invention relates to aircraft turbine engine exhaust systems and in particular to a nozzle, convertible between a plug nozzle configuration and an open convergent/divergent configuration.

BACKGROUND OF THE INVENTION

For various reasons it is desirable to cool the material of gas turbine engine exhaust nozzles. Pressurized air from the gas turbine compressor can be used. This has several disadvantages. The air is heated by compression and therefore operates at an elevated temperature. Significant energy is consumed by compressing the air thereby decreasing the overall efficiency and power output of the engine. While such excess consumption of power is tolerable during the after burning mode, it is undesirable during long term operating conditions.

In order to reduce such cooling air flow requirements in advanced exhaust nozzles, external sources of cooling air such as blowers or ejectors are being considered. However, wall pressures on divergent flaps and sidewalls of conventional nozzles are too high to use these low pressure cooling sources. One solution to this problem is to convert the nozzle to a plug configuration. Existing 2-D plug test data show that wall pressures are almost always equal to ambient pressure along plug surfaces downstream of the throat plane.

The plug configuration however, is not suitable for the after burning mode of operation because its large surface area requires an excessive amount of cooling air; accordingly it is desirable that the nozzle be of the usual convergent/divergent form for after burning operation.

SUMMARY OF THE INVENTION

The nozzle of a gas turbine is convertible from the plug mode for normal operation to the convergent/divergent mode for after burning operation. During the plug mode low pressure cooling air may be used to achieve efficiency during this long term operating condition. In the after burning mode efficiency is not an issue and higher pressure air may be used as required.

A fixed exhaust collar has an internal passage for conducting the gas stream passing from the compressor and turbine. A pair of convergent flaps aft of the collar are moveable from an outboard convergent flap position to a central plug position. In the central position the convergent flaps are in contact with each other forming the forward end of the plug. A pair of divergent flaps are hinged to the aft end of the convergent flaps. These flaps are moveable from an outboard divergent flap position to a central plug position where the divergent flaps are substantially in contact with each other. A pair of plug surface flaps are moveable from an external position outboard of the divergent flaps in the outboard divergent flap position to an inboard position in contact with the convergent flaps at the forward end and forming an aftwardly tapering plug surface.

The plug surface may have at its forward end a manifold as a portion of the plug surface extending across the gas nozzle and conveying ram cooling air into the flaps. This manifold may be unitary with the plug surface flaps or a separate component which is abutted against the remainder of the flaps during the plug mode of operation.

BRIEF DESCRIPTION OF THE DRAWINGS

FIG. 4 is a sectional side view showing the nozzle in the convergent/divergent mode;

FIG. 5 is an aft view showing a nozzle in a convergent/divergent mode;

FIG. 6 is a sectional side view showing an alternate plug mode with a one piece plug surface construction;

FIG. 7 is a sectional side view showing an alternate convergent/divergent mode with a single piece plug surface.

DESCRIPTION OF THE PREFERRED EMBODIMENT

Figure 1:
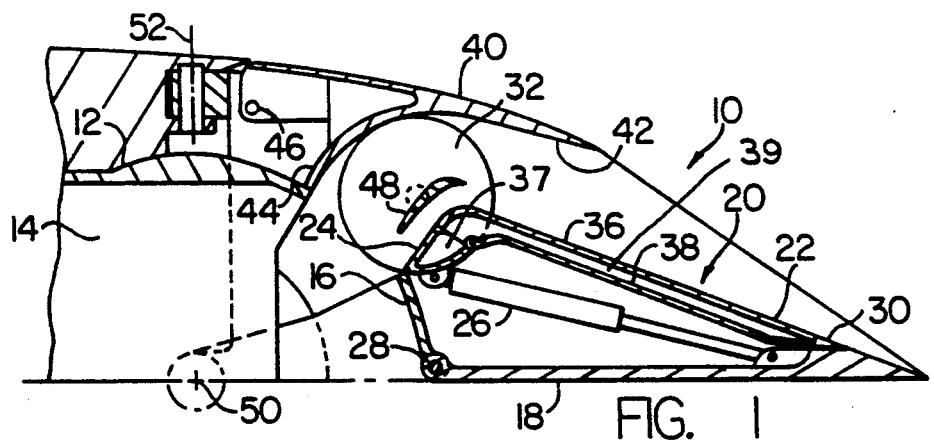
FIG. 1 is sectional side view showing a nozzle in the plug mode.

In FIG. 1 the convertible plug nozzle 10 is illustrated in the plug mode. A fixed exhaust collar 12 has an internal passage 14 for conducting the gas stream from the gas turbine compressor and turbine. A pair of convergent flaps 16 are located aft of the collar and are illustrated here in a central plug position with the pair of convergent flaps in contact with each other. These convergent flaps in this position form the forward end of the plug.

A pair of divergent flaps 18 are hinged to the aft end of the convergent flaps. These are shown in FIG. 1 in the central plug position where the divergent flaps are substantially in contact with each other and out of contact with the gas stream.

There is also a pair of plug surface structures 20, each consisting of the plug surface 22 and a manifold 24. The plug surface structure is shown here in the inboard position forming the plug with the forward end in contact with the convergent flaps 16. The plug surface forms an aftwardly tapering plug surface.

The divergent flap actuator 26 is operative between the manifold portion 24 of the plug surface structure and the divergent flap 18. This is operative to position the divergent flap around the hinge 28 joining the convergent and divergent flaps. The plug surface structure 20 is abutted against the convergent flap 16 at the forward end to provide a seal at that location. The aft end 30 of the plug structure rests against the divergent flap 18. It may be desirable to guide this aft end in slots located in relationship to the divergent flap 18, thereby avoiding movement of this plug surface away from the divergent flap with the concomitant leakage.

A side wall disc 32 is located on each side of each half of the nozzle. This is rotated by an actuator (not shown). This disc carries the manifold 24 which bridges across the nozzle gas stream area. A ram air duct 34 (FIG. 2) conveys ram air up to disc 32 for cooling of the plug surface. There is a open chamber within the plug surface and a plurality of air egress openings 35 in the plug surface 22. These conventional surface cooling openings are used for cooling the surface of gas turbine engines.

An opening 37 through the disc 32 is in registration with the ram air duct 34 in the dry power or plug mode illustrated in FIG. 1. Accordingly ram air is passed through the manifold and through the plug surface 22, passing through open chamber 39 between outer wall 36 and inner wall 38 and through the openings in the wall 36.

An external shroud 40 is located at an outboard location with its inner surface 42 forming a bounding surface of the gas flow portion of the nozzle. The upstream end 44 of this external shroud is in abutment with the collar 12 forming a reasonable seal against any air leakage therethrough. The external shroud 40 is pivotable around a support pin 46. If desired, a guide vane 48 may be placed between the two disc for aiding in the turning of the gas flow. In most cases it is believed however, that this is not necessary.

The convergent flap 16 is pivotable around a first axis 50. The entire nozzle is also rotatable around a second axis 52 for achieving yaw control.

Figure 2:
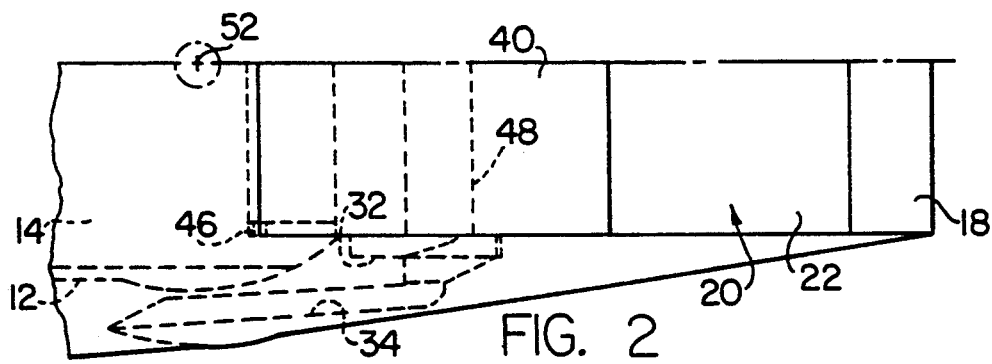
FIG. 2 is a top view showing a nozzle in the plug mode.
Figure 3:
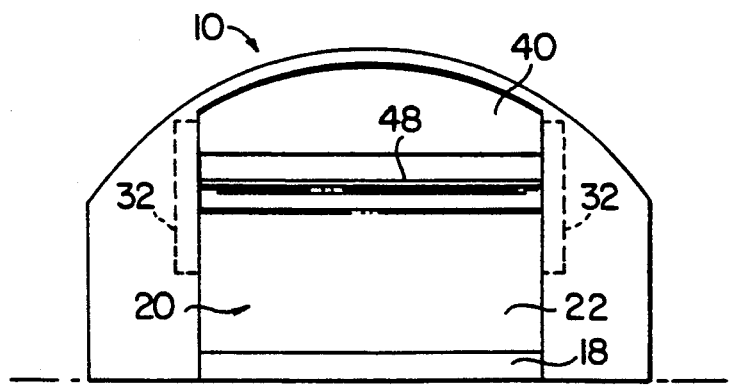
FIG. 3 is an aft view showing a nozzle in the plug mode.
Figure 8:
FIG. 8 is a section through the plug surface.

FIG. 3 illustrates the nozzle in the same mode as in FIGS. 1 and 2 but as viewed from the aft end.

For after burning operation the nozzle of FIGS. 1, 2 and 3 is converted to a convergent/divergent mode as shown in FIGS. 4 and 5. The convergent flap 16 is rotated around the first axis 50 to the illustrated position. The flap 16 is a clam shell with an internal surface conforming to the spherical outer surface 54 of exhaust collar 12. The convergent flaps 16 are located here in an outboard position to form the convergent portion of the nozzle.

Divergent flaps 18 are shown in an outboard divergent flap position forming the divergent portion of the convergent/divergent nozzle. The plug surface flap structure 20 has been moved to an external position outboard of the divergent flaps where it is out of contact with the gas stream, and forms a portion of the boat tail structure. Disc 32 has been rotated by an actuator (not shown) to achieve this position with manifold 24 being rotated therewith. The guide vane 48 has also been rotated with the discs, and is now out of the gas stream. The separation of the manifold 24 from the plug surface portion of the plug surface avoids interference with the baffle during the rotation. It can be seen that the connection 56 of actuator 26 has also been rotated. It is the control of this rotation in combination with the control of actuator 26 which determines the position of the divergent flap 18 as desired.

In order to accommodate the movement of the convergent flaps 16, the external shroud 40 has been moved to permit the passage of the convergent flap between the static structure 12 and the external shroud 40. FIG. 5 is an aft view of FIG. 4.

In FIG. 6 and 7 there is illustrated in the plug mode and convergent/divergent mode respectively an alternate plug nozzle arrangement. The primary difference between this and the earlier described nozzle is the fact that there is no gas flow turning vane and also the plug surface structure is of one piece rather than being formed of a separate manifold portion and plug surface portion.

The plug surface structure 20 is a unitary plug surface 60 hinged at pivot 62 to the rotatable disc 32. The divergent nozzle actuator 26 is hinged at pin 64 to the plug surface.

When rotated to the convergent/divergent mode illustrated in FIG. 7 the support point for the plug surface remains at 62, which is at substantially the same position as it was with the earlier nozzle. The support pin 64 now being carried on the unitary structure of the plug surface 60 is now located as illustrated which is somewhat a variance with its position in the earlier embodiment. The nozzle functions in substantially the same mode except that a different amount of actuation is required for actuator 26 to achieve the same divergent flap positions.

I claim:

1. A convertible plug nozzle for discharging a gas stream form an aircraft gas turbine engine comprising:
   a fixed exhaust collar having an internal passage for conducting the gas stream therethrough;
   a pair of convergent flaps aft of said collar, moveable from an outboard convergent flap position to a central plug position with said pair of convergent flaps in contact with each other at said central plug position;
   a pair of divergent flaps hinged to the aft end of said convergent flaps, moveable from an outboard divergent flap position to a central plug position where said divergent flaps are substantially in contact with each other;
   a pair of plug surface flaps moveable from an external position outboard of said divergent flaps in the outboard divergent flap position, to an inboard position in contact with said convergent flaps at the forward end and forming an aftwardly tapering plug surface; and
   two external shrouds, each forming an outboard surface of a flow path between one of said plug surface flaps and a corresponding one of said external shrouds.

2. An apparatus as in claim 1 further comprising:
   each of said convergent flaps being a clam shell, pivotable around a first common axis.

3. An apparatus as in claim 2 further comprising:
   said fixed static structure comprising a fixed exhaust collar having a semispherical exterior surface; and
   said clam shells each having an internal surface conforming to said exhaust collar exterior surface.

4. An apparatus as in claim 1 further comprising:
   a divergent flap actuator for positioning each divergent flap, each divergent flap actuator located outboard of said divergent flap which it positions and inboard of said plug surface.

5. An apparatus as in claim 4 further comprising:
   said nozzle having two sidewalls;
   a rotatable sidewall disc on each sidewall; and
   one end of said flap actuator secured to said disc, the other side being secured to said divergent flap.

6. An apparatus as in claim 1 comprising also:
   a rotatable sidewall disc;
   said plug surface secured to said rotatable sidewall disc at the forward end, and in contact with said divergent flap at the aft end.

7. An apparatus as in claim 6 further comprising:
   a ram air duct for conveying ram air to said sidewall disc;
   an open chamber within said plug surface;
   a plurality of cooling air egress openings in said plug surface; and
   an opening through said disc in registration with said ram air duct and said open chamber when said plug surface flaps are in the inboard position.

8. An apparatus as in claim 6 further comprising:
   means for passing a cooling air flow through said disc, and through said divergent flaps.

9. An apparatus as in claim 8 further comprising:
   each of said external shrouds in contact with said collar when said divergent flaps are in said central plug position; and
   each shroud spaced from said collar to permit the passage of said convergent flap when said divergent flaps are in said outboard divergent flap position.

* * * * *